(12) United States Patent
Maeno et al.

(10) Patent No.: US 7,168,692 B2
(45) Date of Patent: Jan. 30, 2007

(54) FLUID FILLED VIBRATION DAMPING DEVICE WHOSE FLEXIBLE LAYER HAVING THICK WALLED PORTION

(75) Inventors: Hajime Maeno, Kasugai (JP); Koichi Maeda, Nishikamo-gun (JP); Kazuhiko Kato, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 2 days.

(21) Appl. No.: 10/769,089

(22) Filed: Jan. 30, 2004

(65) Prior Publication Data

US 2004/0183240 A1 Sep. 23, 2004

(30) Foreign Application Priority Data

Jan. 31, 2003 (JP) .............................. 2003-024383

(51) Int. Cl.
*F16F 5/00* (2006.01)
(52) U.S. Cl. ................. 267/140.13; 267/141.6
(58) Field of Classification Search ..................
267/140.11–140.13, 140.3, 140.4, 141, 141.6 X, 267/141.7; 248/562, 636
See application file for complete search history.

(56) References Cited

U.S. PATENT DOCUMENTS

| | | | | |
|---|---|---|---|---|
| 4,401,298 A | * | 8/1983 | Eaton et al. ............ | 267/140.13 |
| 4,730,584 A | * | 3/1988 | Jordens et al. .......... | 267/140.14 |
| 4,834,348 A | * | 5/1989 | Jordens et al. .......... | 267/140.13 |
| 4,997,169 A | * | 3/1991 | Nakamura et al. ...... | 267/140.13 |
| 5,040,774 A | * | 8/1991 | Veverka et al. ......... | 267/140.12 |
| 5,927,698 A | * | 7/1999 | Miyoshi et al. ......... | 267/140.13 |
| 6,250,615 B1 | * | 6/2001 | Leibach .................. | 267/140.13 |
| 6,598,865 B1 | * | 7/2003 | Kato ....................... | 267/140.13 |

FOREIGN PATENT DOCUMENTS

| | | |
|---|---|---|
| JP | 5-272580 | 10/1993 |
| JP | 2000-274480 | 10/2000 |
| JP | 2001-59540 | 3/2001 |

* cited by examiner

*Primary Examiner*—Xuan Lan Nguyen
(74) *Attorney, Agent, or Firm*—Beyer Weaver & Thomas LLP

(57) ABSTRACT

A fluid filled vibration damping device including: an elastic body elastically connecting a first and a second mounting member and partially defining a pressure receiving chamber filled with a non-compressible fluid and undergoing fluid pressure variation upon application of vibrational load between the first and second mounting members; a flexible diaphragm partially defining an equilibrium chamber filled with the non-compressible fluid and whose volume is variable; and an orifice passage permitting a fluid communication between the pressure-receiving chamber and the equilibrium chamber. The flexible diaphragm is constituted by a rubber elastic layer having an annular thick-walled portion and a central thick-walled portion situated at a substantially central portion of an inner area surrounded by the annular thick-walled portion, while being independent of the annular thick-walled portion.

4 Claims, 6 Drawing Sheets

FLUID FILLED VIBRATION DAMPING DEVICE WHOSE FLEXIBLE LAYER HAVING THICK WALLED PORTION

INCORPORATED BY REFERENCE

The disclosure of Japanese Patent Application No. 2003-024383 filed on Jan. 31, 2003 including the specification, drawings and abstract is incorporated herein by reference in its entirety.

BACKGROUND OF THE INVENTION

1. Field of the Invention

The present invention relates generally to fluid filled vibration damping devices exhibiting damping effect on the basis of flows of the non-compressible fluid sealed therein, and more particularly to a fluid filled vibration damping device of novel construction, which may be usable as an engine mount or other mounts for use in automotive vehicles.

2. Description of the Related Art

A fluid filled vibration damping device is known as one type of a vibration-damping coupling or mount adapted to be installed between two members of a vibration systems so as to elastically connect or support the two members in a vibration-damping fashion. A typical fluid filled vibration-damping device includes, as shown in JP-A-2001-59540 for example, a rubber elastic body elastically connecting a first and second mounting member fixable to one and the other member of the vibration system, respectively, a pressure receiving chamber partially defined by the rubber elastic body and filled with a non compressible fluid, an equilibrium chamber partially defined by a flexible layer and filled with the non-compressible fluid, and an orifice passage for permitting a fluid communication between the pressure-receiving chamber and the equilibrium chamber. Upon application of a vibrational load between the first and second mounting members, a fluid pressure in the pressure receiving chamber varies due to the elastic deformation of the elastic body, while a change in volume of the equilibrium chamber is permitted due to elastic displacement or deformation of the flexible layer, whereby the fluid is forced to flow through the orifice passage between the pressure receiving chamber and the equilibrium chamber. Such a conventional fluid filled vibration damping device is able to exhibit excellent vibration damping effect on the basis of resonance or flows of the fluid through the orifice passage, which effect is so superior that a vibration damping device simply relying on a rubber elastic body cannot achieve it. For the above-described advantage, the conventional fluid filled vibration damping device has been attempted to be used as an engine mount, a body mount, or other mounts for automotive vehicles, for example.

In the conventional vibration damping device, the flexible layer is generally formed of a thin rubber elastic layer. In order to provide a sufficient amount of fluid flows through the orifice passage upon application of vibration, and in order to realize an excellent damping performance of the device, important is to permit sufficient amount of volumetric change in the equilibrium chamber by sufficiently increasing a permissible amount of distending deformation of the flexible layer.

However, if the permissible amount of distending deformation of the flexible layer is excessively large, the flexible layer excessively distending outwardly would be brought into contact with a bracket or other members, when these members are disposed in the vicinity of the flexible layer. This may possibly cause a problem of deterioration in durability of the flexible layer.

To enhance the durability of the flexible layer, it may be proposed to increase the wall thickness of the overall flexible layer. However, this measure makes it difficult for the flexible layer to permit a sufficient permissible amount of distending deformation thereof, possibly leading to decrease in the amount of fluid flows through the orifice passage, whereby the damping performance with the help of the orifice passage is considerably decreased.

Further, in order to enhance durability of the flexible layer, it may be proposed to partially increase the wall thickness of the flexible layer, at an interference area where the flexible layer is brought into contact with the other member(s). In this measure, although the flexible layer has its wall thickness enlarged in the interference area, the interference between the flexible layer and the other member(s) is not avoidable, and the interference area of the flexible layer is finally brought into contact with the other member(s). Conversely, this may cause a relatively large impact noise in comparison with the case where the flexible layer has no thick walled portion. Therefore, the conventionally proposed measures have not been appropriate to solve the aforesaid conventionally experienced problems.

SUMMARY OF THE INVENTION

It is therefore one object of this invention to provide a fluid filled vibration damping device of novel construction, which is capable of ensuring a sufficient permissible amount of distending deformation of a flexible layer, and eliminating and minimizing problems of impact noise and low durability of the flexible layer due to its contact or interference with other components, as well.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of this invention provides a fluid filled vibration damping device for connecting two members in a vibration damping fashion, including: a first mounting member fixable to one of the two members; a second mounting member fixable to an other of the two members; an elastic body elastically connecting the first and second mounting members and partially defining a pressure receiving chamber filled with a non-compressible fluid and undergoing fluid pressure variation upon application of vibrational load between the first and second mounting members; a flexible diaphragm partially defining an equilibrium chamber filled with the non-compressible fluid and whose volume is variable; and an orifice passage permitting a fluid communication between the pressure-receiving chamber and the equilibrium chamber, wherein the flexible diaphragm being constituted by a rubber elastic layer and having an annular thick-walled portion and a central thick-walled portion situated at a substantially central portion of an inner area surrounded by the annular thick-walled portion, while being independent of the annular thick-walled portion.

In a fluid filled vibration damping device constructed according to the first mode of the invention, if the rubber elastic layer undergoes distending deformation, the rubber elastic layer is subjected to tensile deformation so as to expand in a direction along its surface. Since the wall thickness of the annular thick-walled portion is made larger than that of the other part of the elastic body, the annular thick walled portion can generate a restricting force responsive to the tensile deformation in its circumferential direction. With this arrangement, even when a fluid pressure in the equilibrium chamber is entirely evenly exerted on the rubber elastic layer, an amount of deformation of the thick-walled portion may be entirely limited.

With this regards, an amount of elastic deformation of the rubber elastic layer is not limited entirely, but limited at a portion where the annular thick-walled portion is formed. In addition, the inner area of the thick-walled portion is formed with a reduced thickness, whereby the inner area permits easily its elastic deformation in the distending direction thereof, as well. Therefore, the annular thick-walled portion makes it possible, without restricting unnecessarily wide area of the rubber elastic layer, to advantageously limit an amount of its distending deformation at the portion where the annular thick-walled portion is formed, while effectively permitting a sufficient amount of volumetric change in the equilibrium chamber based on the elastic deformation of the rubber elastic layer.

Moreover, the inner area surrounded by the annular thick walled portion is formed with the central thick walled portion situated at a central portion thereof that distends most outwardly. Therefore, if the central portion of the inner area comes into contact with another member, desired durability of the rubber elastic layer can be advantageously ensured by the central thick walled portion. In addition, since the periphery of the inner area is substantially restricted by the annular thick walled portion, an outward elastic deformation of the inner area is thus restricted. Therefore, even in the case where the central thick walled portion comes into contact with another member, is effectively restricted an abutment force of the central thick walled portion against the other member, effectively eliminating or reducing generation of impact noises or other defects.

The configurations and the wall thickness dimensions of the annular thick walled portion and the central thick walled portion are not particularly limited, but may be suitably determined taken into account a material or required properties of the rubber elastic layer, a clearance between thereof and other members, or the like. For instance, the annular thick walled portion and the central thick walled portion may be equal to, or alternatively varied from each other in terms of their wall thickness dimension. The annular thick walled portion has a wall thickness thicker than do an inner and outer circumferential side portions thereof. The annular thick walled portion and the central thick walled portion may provide its wall thickness on either or both sides of the rubber elastic layer. Further, on the rubber elastic layer partially defining the equilibrium chamber, may be provided one or more of the annular thick walled portion and the central thick walled portion.

A second mode of the invention provides a fluid filled vibration damping device according to the first mode, further comprising a mounting bracket provided to at least one of the first and second mounting members, and the annular thick walled portion and the central thick walled portion are formed at a portion of the rubber elastic layer situated opposite to the mounting bracket.

According to this mode of the invention, in the case where the rubber elastic layer comes into contact or interference with a bracket for mounting the first mounting member on one of the two member to be connected in a vibration damping manner, for example, the rubber elastic layer can be improved in its durability, while advantageously obtaining a sufficient amount of volumetric change in the equilibrium chamber, and a resultant amount of flow of the fluid flowing through the orifice passage. This arrangement enables to employ a mounting bracket having a likelihood of an interference with the rubber elastic layer, and makes it possible to decrease a space for installation of a fluid filled vibration-damping device with bracket. Also, this arrangement enhances a degree of freedom in designing the fluid filled vibration-damping device including the mounting bracket.

A third mode of the present invention provides a fluid filled vibration damping device according to the first or second mode, wherein the annular thick-walled portion has an inner and an outer circumferential edge of a smooth curvature configuration with no apparent corner on an entire circumference thereof. This arrangement makes it possible to ease stress concentration generated at thin walled portions adjacent to the inner and outer circumferential edges of the annular thick walled portion, thereby enhancing durability of the rubber elastic layer.

A fourth mode of the present invention provides a fluid filled vibration damping device according to any one of the first through third modes of the invention, wherein the annular thick-walled portion is partially bonded to the first or second mounting members. While the elastic deformation of the rubber elastic layer is consistently restricted by the first or second mounting member at its bonding portion to the mounting member, the bonding portion of the rubber elastic layer is constituted by the annular thick walled portion and accordingly has a sufficiently large wall thickness. This further enhances durability of the bonding portion of the rubber elastic layer, and the rubber elastic layer it self.

A fifth mode of the present invention provides a fluid filled vibration damping device according to any one of the first through fourth modes of the invention, wherein the rubber elastic layer has a curved slack portion, and at least the inner area situated inside the annular thick-walled portion, is formed at an area flatter than the curved slack portion. According to this arrangement, a portion of the rubber elastic layer where the wall thickness is varied by the annular thick-walled portion and the central thick walled portion can be entirely formed on the flatter area as much as possible. This makes it possible to avoid that thick walled portions of the rubber elastic layer promotes stress concentration due to local bending or the like, resulting in further enhanced durability of the rubber elastic layer.

A sixth mode of the present invention provides a fluid filled vibration damping device according to any one of the first through fifth modes of the invention, wherein the first mounting member is bonded to a central portion of the elastic body and the second mounting member is bonded to an outer circumferential portion of the second mounting member so that the elastic body elastically connects the first and second mounting members, and the pressure receiving chamber is disposed on an inside of the elastic body, while the rubber elastic layer is disposed surrounding an outside surface of the elastic body such that a central portion thereof is bonded to the first mounting member and an outer peripheral portion thereof is bonded to the second mounting member, to provide the equilibrium chamber on an outside of the elastic body.

According to this mode, the pressure receiving chamber and the equilibrium chamber are formed on the opposite sides of the elastic body that is elastically connecting the first and second mounting members, making it possible to minimize entire size of the vibration damping device, especially in an axial direction of the device in which a primary vibrational load is applied to the device. Although, in this case, the rubber elastic layer disposed surrounding the rubber elastic body is likely to come into contact or interference with other members, the present invention can effectively ensure durability of the rubber elastic layer as described above.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
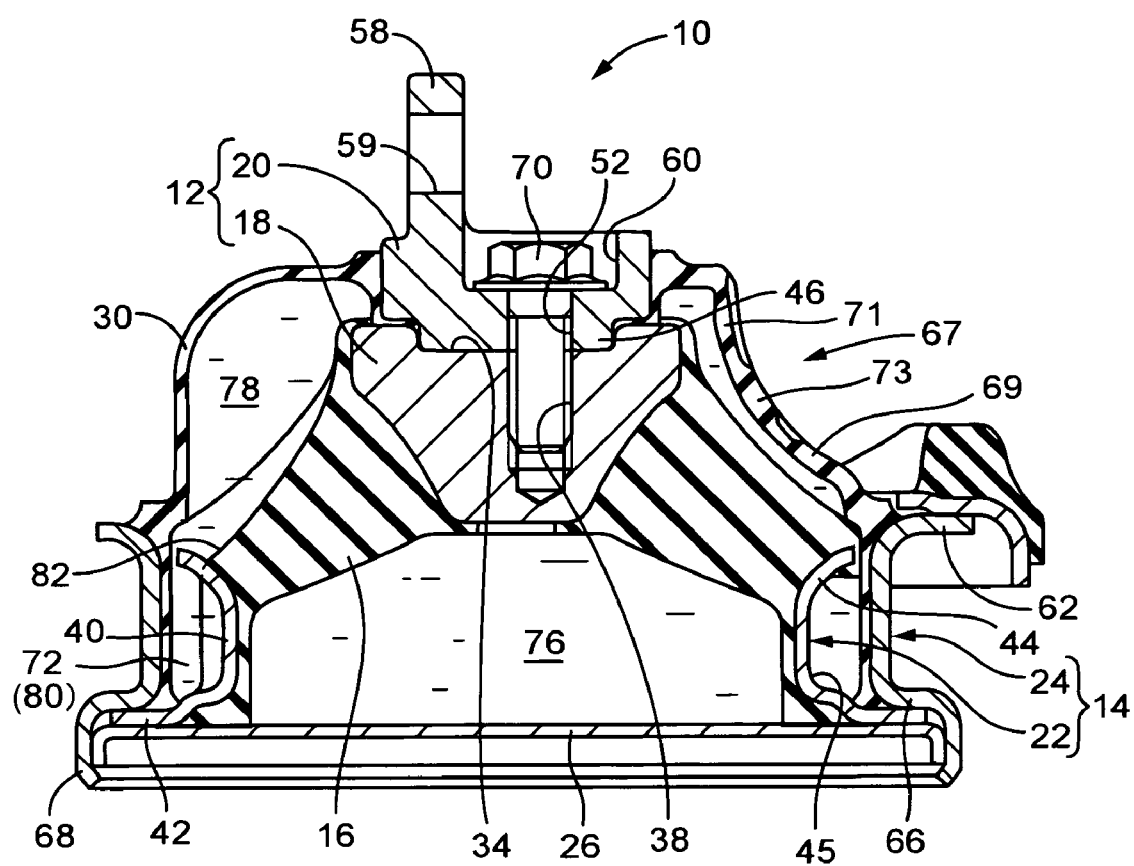
FIG. 1 is an elevational view in axial or vertical cross section of a fluid filled vibration damping device in the form of an engine mount for use in an automotive vehicle, which is constructed according to one preferred embodiment of the invention, and which corresponds to a cross sectional view taken along line 1—1 of FIG. 3.

Referring first to FIGS. 1–4, shown is a fluid filled vibration damping device in the form of an engine mount 10 constructed according to a first embodiment of the present invention. The engine mount 10 includes a first mounting member 12 and a second mounting member 14 which are both made of metal, and are elastically connected to each other via a rubber elastic body 16 interposed therebetween. With the first mounting member 12 fixed to a power unit (not shown) of the vehicle, and the second mounting member 14 fixed to a body (not shown) of the vehicle, the engine mount 10 can support the power unit on the body of the vehicle in a vibration damping fashion. With the engine mount 10 installed in position as described above, a vibrational load to be damped is primarily applied between the first and second mounting members 12, 14 in an approximately axial direction of the engine mount 10, i.e., the vertical direction as seen in FIG. 1. In the following description, the vertical direction is basically equal to the vertical direction as seen in FIG. 1.

The first mounting member 12 includes an elastic-body-side inner member 18 and a diaphragm-side inner member 20, while the second mounting member 14 includes an elastic-body-side outer sleeve member 22 and a diaphragm-side outer sleeve member 24. The elastic-body-side inner member 18 and the elastic-body-side outer sleeve member 22 are bonded to the rubber elastic 16 by an integral vulcanization molding of a rubber material with the two members 18, 22, thereby providing a first integral vulcanization product 28. Likewise, the diaphragm-side inner member 20 and the diaphragm-side outer sleeve member 24 are bonded to a flexible layer constituted by a rubber elastic layer in the form of a flexible diaphragm 30 by integral vulcanization molding of a rubber material with the two members 20, 24, thereby providing a second integral vulcanization product 32. These first and second integral vulcanization products 28, 32 are mutually assembled.

Described in detail, the elastic-body-side inner member 18 of the first integral vulcanization product 28 has an approximately inverted truncated conical shape in its entirety. An upper end face (large diameter end face) of the elastic-body-side inner member 18 has a fitting recess 34 open therein, and a tapped hole 38 is open in a bottom face of the fitting recess 34.

The elastic-body-side outer sleeve member 22 includes a cylindrical wall portion 40 of substantially large-diameter cylindrical configuration, and a flange portion 42 integrally formed at an axially lower end portion of the cylindrical wall portion 40, and extending diametrically outwardly. An axially upper end portion of the cylindrical wall portion 40 provides a tapered cylindrical portion 44 whose diameter gradually increases as its goes axially upward. The elastic-body-side outer sleeve member 22 of this configuration provides a circumferential groove 45 open in an outer circumferential surface thereof and extending circumferentially with a circumferential length slightly smaller than a circumference thereof. The elastic-body-side inner member 18 is disposed upward of and concentrically with the elastic-body-side outer sleeve member 22 with an axial spacing therebetween, such that an outer circumferential surface of tapered configuration of the elastic-body-side inner sleeve member 18 and an inner circumferential surface of the tapered cylindrical portion 44 of the elastic-body-side outer sleeve member 22 are mutually opposed to each other with a spacing therebetween. The elastic body 16 is disposed in between and elastically connecting the outer circumferential surface of the elastic-body-side inner sleeve member 18 and the inner circumferential surface of the tapered cylindrical portion 14.

The elastic body 16 has a large-diameter truncated conical shape in its entirety. In a small diameter or central portion of the elastic body 16, the elastic-body-side inner member 18 is embedded in a coaxial relationship with the elastic body 16, by the aforesaid integral vulcanization molding. In a large diameter portion of the elastic body 16, the tapered cylindrical portion 44 of the elastic-body-side outer sleeve member 22 is bonded to an outer circumferential surface of the elastic body 16 by the aforesaid integral vulcanization molding. Thus, the elastic body 16 is equipped with the elastic-body-side inner member 18 and the elastic-body-side outer sleeve member 22, providing the first integral vulcanization product 28.

On the other hand, the diaphragm-side inner member 20 of the second integral vulcanization product 32 has a thick-walled disk shape. The diaphragm-side inner member 20 has a fitting projection 46 projecting outward from its lower face, and a through hole 52 extending through the fitting projection 46. The diaphragm-side inner member 20 further includes an integrally formed mounting plate portion 58 projecting outward from its upper face. The mounting plate portion 58 is of a rectangular plate configuration, and has a bolt hole 59 extending through its central portion. The diaphragm-side inner member 20 has a bolt head housing recess 60 open in its upper end face and disposed in coaxial relationship with the through hole 52. The bolt head housing recess 60 has a diameter so as not to reach the mounting plate portion 58.

The diaphragm-side outer sleeve member 24 has a thick-walled large-diameter cylindrical shape in its entirety, and has a mounting plate portion 62 integrally formed at its axially upper open end portion extending diametrically outwardly. The mounting plate portion 62 has a plurality of through holes into which fixing bolts 64 secured press fit, respectively. The diaphragm-side outer sleeve member 24 also has a flange portion 66 integrally formed at its axially lower open-end portion extending diametrically outwardly. Integrally formed at an outer peripheral edge of the flange portion 66 is an annular caulking lip 68 projecting axially downward.

The diaphragm-side inner member 20 is disposed upward of and concentrically with the diaphragm-side outer sleeve member 24 with an axial spacing therebetween, and is elastically connected with the diaphragm-side outer sleeve member 24 by a diaphragm 30.

The diaphragm 30 is a thin rubber layer of approximately annular configuration, and extends circumferentially with a curve cross section as to provide a large slack to permit an easy elastic deformation thereof. An inner peripheral edge of the diaphragm 30 is bonded to an outer peripheral edge of the diaphragm-side inner member 20 by the aforesaid integral vulcanization molding, and an outer peripheral edge of the diaphragm 30 is bonded to the axially upper open end portion of the diaphragm-side outer sleeve member 24 by the afore said integral vulcanization molding. Thus, the diaphragm 30 is equipped with the diaphragm-side inner member 20 and the diaphragm-side outer sleeve member 24, providing the second integral vulcanization product 32.

In the present embodiment, a cross sectional shape of the diaphragm 30 is changed at one circumferential position so as to provide an intended abutment portion 67 where a relatively small amount of outward distending deformation thereof is permitted. More specifically, the diaphragm 30 of annular configuration basically has a cross sectional shape extending diametrically so as to connect the diaphragm-side inner member 20 and the diaphragm-side outer member 24 with an outwardly curved arcuate configuration. The diaphragm 30 has a curved slack portion. However, at the circumferential position where is formed the intended abutment portion 67, the cross sectional shape of the diaphragm 30 is an approximately flat plate somewhat curved inwardly, as shown in FIG. 1. Namely, the intended abutment portion 67 is formed flatter than does the curved slack portion.

Figure 5:
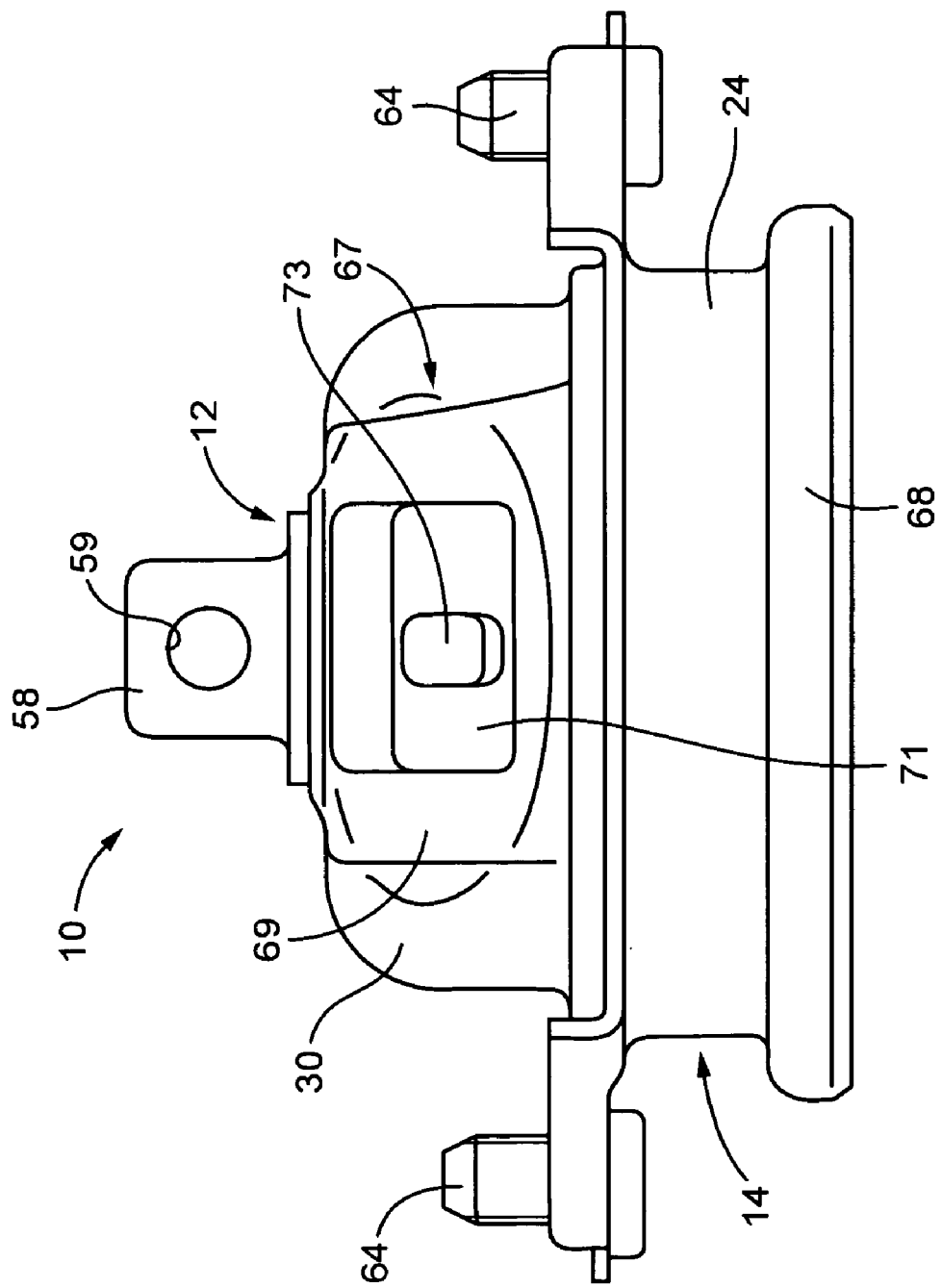
FIG. 5 is a front elevational view of the engine mount of FIG. 1, as seen in a direction indicated by arrows 5—5 of FIG. 4.

As is well apparent from FIG. 5, the intended abutment portion 67 has an annular thick walled portion 69 at its outside peripheral portion. In the present embodiment, each of an inner and outer circumferential edge of the annular thick walled portion 69 is of substantially rectangular configuration with rounded corners, and no apparent corner is formed on its entire circumference thereof, thus eliminating or minimizing a problem of local stress concentration during displacement of the diaphragm 30.

The intended abutment portion 67 has an inner area 71 surrounded by and situated on the inside of the annular thick-walled portion 69. The inner area 71 has a wall thickness dimension smaller than that of the annular thick-walled portion 69. Namely, in the present embodiment, the diaphragm 30 measures a substantially same wall thickness dimension at the inside and outside of the annular thick walled portion 69. In the substantially central portion of the inner area 71, a central thick walled portion 73 is formed. The central thick-walled portion 73 has a wall thickness dimension larger than that of the other part of the inner area 71, and as large as that of the annular thick-walled portion 69. The central thick-walled portion 73 is surrounded by the thin-walled inner area 71 over its entire circumference, so that the thick-walled portion 73 is situated separately from the annular thick walled portion 69. With this regards, the central thick walled portion 73 as well as the annular thick-walled portion 69 may be made thick on either side of the diaphragm 30.

As shown in FIG. 5, the annular thick-walled portion 69 partially extends beyond the intended abutment portion at its outer circumferential edge, but is held within the area of the substantially planar intended abutment portion 67 at its inner circumferential edge that partially defines the inner area 71. The outer circumferential edge of the annular thick-walled portion 69 is partially extend to a portion at which the diaphragm 30 is bonded to the diaphragm-side outer sleeve member 24.

The second integral vulcanization product 32 is superposed on and assembled with the first integral vulcanization product 28 such that the diaphragm-side inner member 20 is affixed to the elastic-body-side inner member 18, while the diaphragm-side outer sleeve member 24 is affixed to the elastic-body-side outer sleeve member 22. With the first and second vulcanization products 28, 32 assembled together, the diaphragm 30 is situated outward of the elastic body 16 with a spacing therebetween, while covering an entire outer circumferential surface of the elastic body 16.

Namely, the diaphragm-side inner member 20 is directly superposed on the upper surface of the elastic-body-side inner member 18 with its fitting projection 46 secured press fit into the fitting recess 34 of the elastic-body-side inner member 18. With this mating state, the diaphragm-side inner member 20 and the elastic-body-side inner member 18 are mutually positioned in a coaxial fashion. On an outer and inner circumferential surface of the fitting projection 46 and the fitting recess 34, are provided engaging portions 50, 36, respectively (see FIG. 2). By means of mutual engagement of the engaging portions 50, 36, the diaphragm-side inner member 20 and the elastic body-side inner member 18 are mutually positioned in a circumferential direction as well, whereby the through hole 52 of the diaphragm-side inner member 20 and the tapped hole 38 of the elastic-body-side inner member 18 are in alignment with each other.

Figure 2:
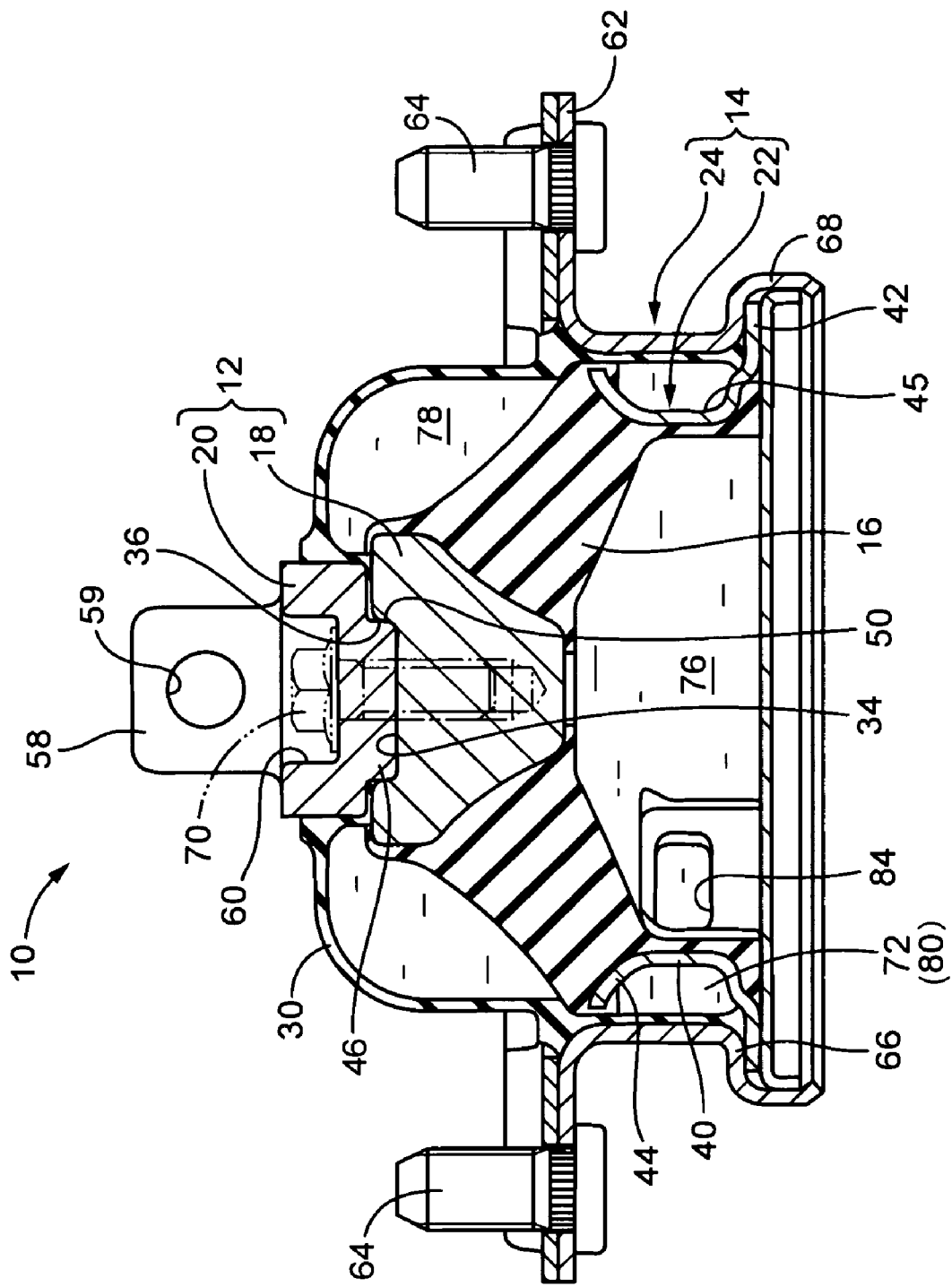
FIG. 2 is an elevational view in axial or vertical cross section of the engine mount of FIG. 1, taken along line 2—2 of FIG. 3.
Figure 3:
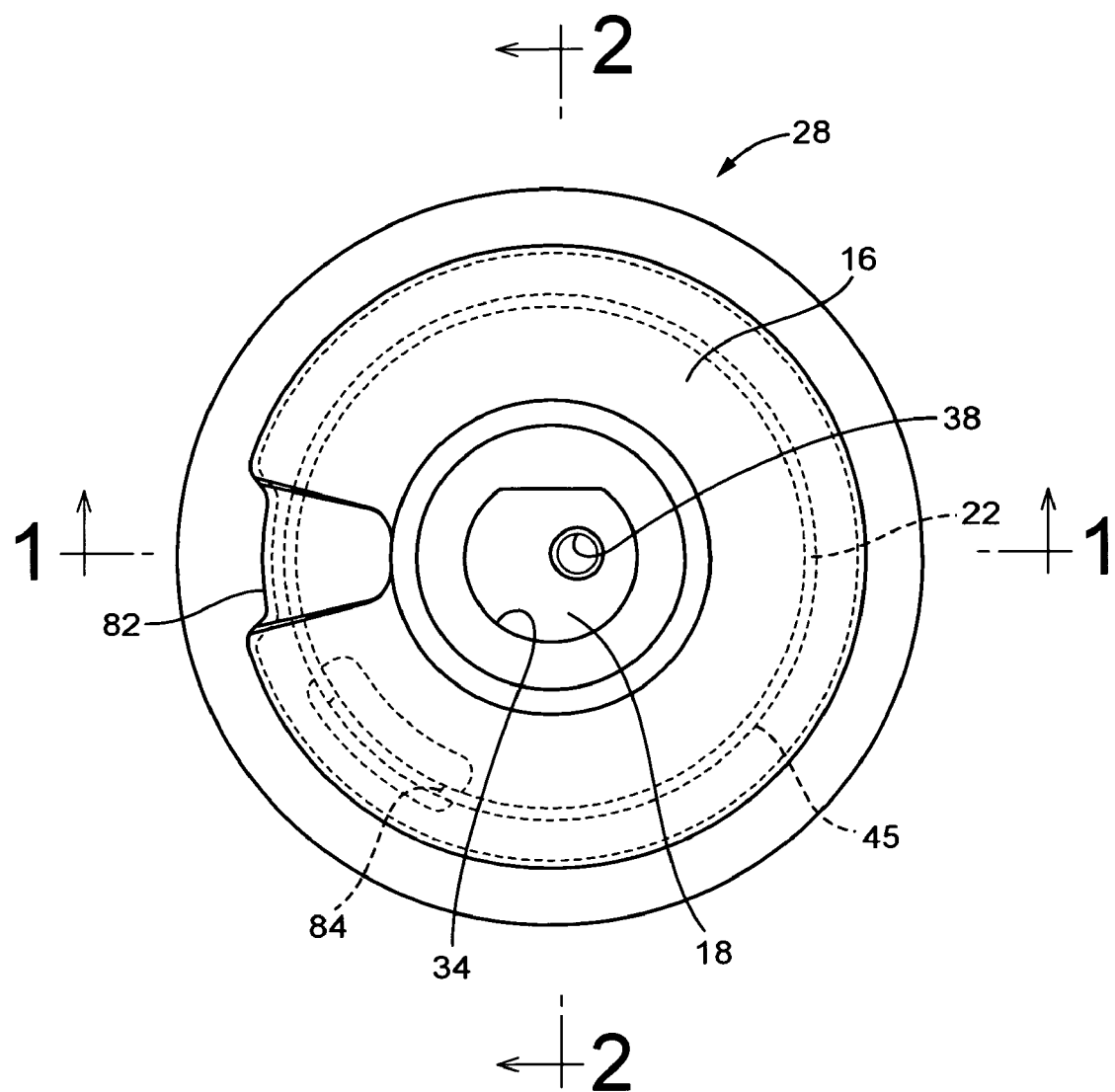
FIG. 3 is a top plane view of a first integral vulcanization product of the engine mount of FIG. 1.
Figure 4:
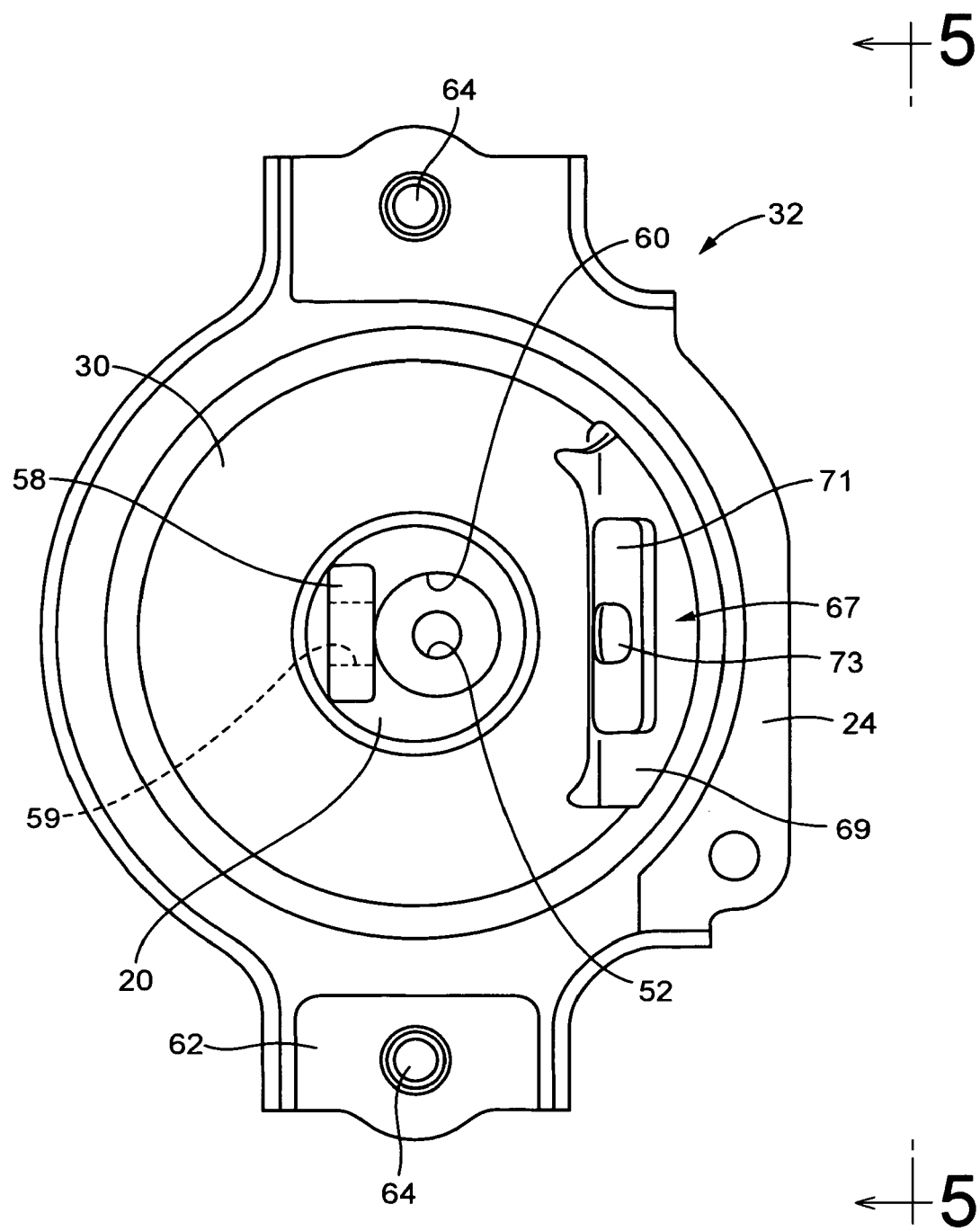
FIG. 4 is a top plane view of a second integral vulcanization product of the engine mount of FIG. 1.

With the elastic-body-side inner member 18 and the diaphragm-side inner member 20 assembled with each other as shown in FIGS. 1 and 2, a connecting bolt 70 is inserted through the through hole 52 and threaded and tightened into the tapped hole 38. With the elastic-body-side inner member 18 and the diaphragm-side inner member 20 connected together by means of the connecting bolt 70, is provided the first mounting member 12.

On the other hand, the diaphragm-side outer sleeve member 24 is assembled from the axially upper side with the elastic-body-side outer sleeve member 22, so as to be disposed about the elastic-body-side outer sleeve member 22. At the lower side of the elastic-body-side outer sleeve member 22, the flange portion 42 is held in contact at its peripheral portion with the flange portion 66 of the diaphragm-side outer sleeve member 24 in the axial direction. At the upper side, an open peripheral portion of the tapered cylindrical portion 44 is held against the inner circumferential surface of the diaphragm-side outer sleeve member 24 in the diametric direction. With this mating state, the caulking lip 68 of the diaphragm-side outer sleeve member 24 is caulked against the peripheral portion of the flange portion 42 of the elastic-body-side outer sleeve member 22, whereby the elastic-body-side outer sleeve member 22 and the diaphragm-side outer sleeve member 24 are mutually fastened together. In addition, the upper and lower end of the elastic-body-side outer sleeve member 22 are held against the diaphragm-side outer sleeve member 24 with sealing rubber layers integrally formed with the elastic body 16 and the diaphragm 30 compressed therebetween, respectively, so as to provide a fluid-tight sealing therebetween.

With the elastic-body-side outer sleeve member 22 assembled with the diaphragm-side outer sleeve member 24 as described above, the opening of the circumferential groove 45 is fluid-tightly closed by the diaphragm-side outer sleeve member 24. Thus, there is formed an annular fluid passage 72 continuously extending in the circumferential direction between the cylindrical wall portion 40 of the elastic-body-side outer sleeve member 22 and the diaphragm-side outer sleeve member 24, with a given circumferential length, or over an entire circumference of the cylindrical wall portion 40. On the lower side of the elastic-body-side outer cylindrical member 22, is disposed a large diameter disk shaped lid member 26 of metal that is held in contact with the lower end faces of the elastic body 16 and the flange portion 42 of the elastic-body-side outer sleeve member 22. An peripheral edge portion of the lid member 26 is fixed, together with the flange portion 42 of the elastic-body-side outer sleeve member 22, against to the flange portion 66 of the diaphragm-side outer sleeve member 24 by caulking the caulking lip 68 against the lid member 26. With this arrangement, an axially lower open-end portion of the elastic-body-side outer sleeve member 22 is fluid-tightly closed by the lid member 26. A fluid-tight sealing at an interface between the elastic-body-side outer sleeve member 22 and the lid member 26 is provided by means of a sealing rubber integrally formed with the elastic body 16.

The thus mutually assembled diaphragm-side outer sleeve member 24, the elastic-body-side outer sleeve member 22, and the lid member 26 are fastened together by caulking, to thereby provide the second mounting member 14 that is elastically connected to the first mounting member via the elastic body 16.

With the lower open end of the second mounting member 14 fluid-tightly closed with the lid member 26, a pressure-receiving chamber 76 filled with a non-compressible fluid is formed between the elastic body 16 and the lid member 26. The pressure-receiving chamber 76 is partially defined by the elastic body 16, and undergoes fluid pressure variation due to elastic deformation of the elastic body during input of vibrational load between the first mounting member 12 and the second mounting member 14.

Further, with the elastic body 16 and the diaphragm 30 are bonded to the first and second mounting members 12, 14 at their inner circumferential edge portions and outer circumferential edge portions, respectively, an equilibrium chamber 78 filled with the non-compressible fluid is formed between the elastic body 16 and the diaphragm 30. Namely, the equilibrium chamber 78 is partially defined by the diaphragm 30 easily deformable, so as to permit a volumetric change on the basis of elastic deformation of the diaphragm 30. Generally, a non-compressible fluid filling the pressure-receiving chamber 76 and the equilibrium chamber 78 is preferably a low viscous fluid whose viscosity is 0.1 Pa.s or lower, for permitting the engine mount 10 to exhibit a high damping effect at a required frequency range on the basis of resonance of the non-compressible fluid flowing through an orifice passage 50 that will be described later.

The aforesaid annular fluid passage 72 formed within the second mounting member 14, is connected at its opposite ends to the pressure receiving chamber 76 on the lower side of the elastic body 16 and equilibrium chamber 78 on the upper side of the elastic body 16 through communication holes 82, 84, thereby providing an orifice passage 80 with a given length for permitting, which permits a fluid communication between the pressure receiving chamber 76 and the equilibrium chamber 78. As well known in the art, the fluid is forced to flow through the orifice passage 80 on the basis of relative fluid pressure variation caused between the pressure receiving chamber 76 and the equilibrium chamber 78 during input of vibrational load. Thus, the engine mount 10 can exhibit excellent damping effect with respect to the input vibrational load on the basis of resonance of the fluid flowing through the orifice passage 80. The damping performance of the engine mount 10 on the basis of the flows of the fluid through the orifice passage 80 can be adjusted in terms of a frequency characteristic, by only tuning a ratio of the cross sectional area to the length of the orifice passage 80.

The engine mount 10 of construction as discussed above is installed between a power unit and body of the vehicle (not shown) such that the mounting plate portion 58 of the first mounting member 12 is fixed to the power unit of the vehicle, and the mounting plate portion 62 of the second mounting member 14 is superposed on and fastened by means of the connecting bolt 70 to the body. Thus, the engine mount 10 can elastically mount the power unit on the body in a vibration isolation fashion.

Figure 6:
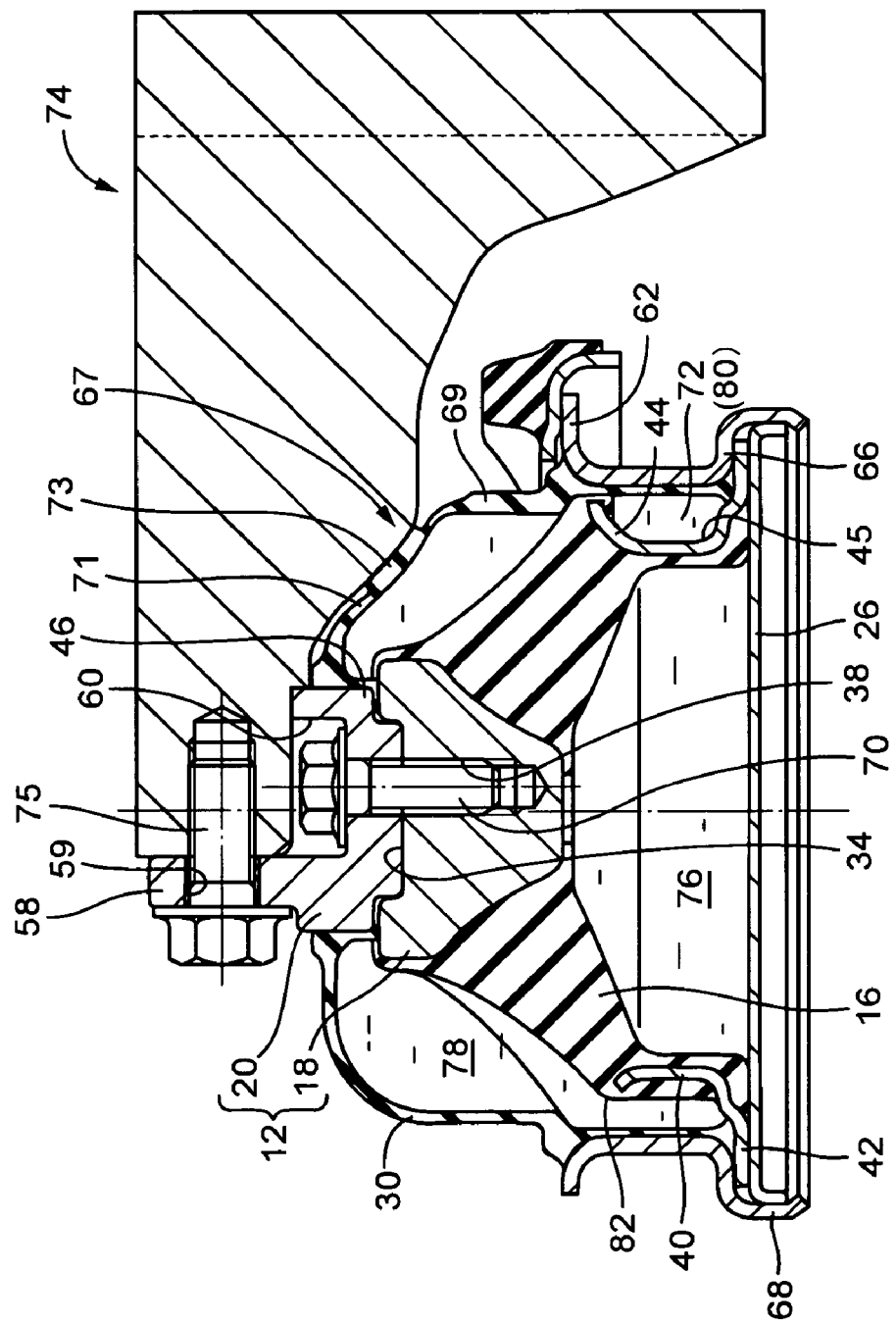
FIG. 6 is a vertical cross sectional view of the engine mount of FIG. 1 where the engine mount is installed in position with its flexible layer distending outwardly.

As shown in FIG. 6, the first mounting member 12 is fixed to the power unit via a mounting bracket 74. More specifically, one end of the bracket 74 is fastened to the mounting plate portion 58 of the diaphragm-side inner member 20 by means of a mounting bolt 75, whereby the bracket 74 is fixed to the inner mounting member 12 so as to extend outward from the first mounting member 12 in a direction orthogonal to a center axis of the engine mount 10. While not illustrated, the other end of the bracket 74 is fastened to the power unit of the vehicle by means of a mounting bolt extending through a through hole formed through an appropriate portion of the bracket 74.

With the engine mount 10 installed in position as described above, the diaphragm 30 is disposed about the elastic body 16 covering the outside of the elastic body 16, and is located below the bracket 74 at one circumferential position thereof. One circumferential portion of the diaphragm 30, which is situated opposite to the bracket 74, is formed as the intended abutment portion 67.

With this state, the engine mount 10 is able to exhibit high damping effect on the basis of resonance of the fluid flowing through the orifice passage 80 due to a relative fluid pressure variation caused between the pressure-receiving chamber 76 and the equilibrium chamber 78, with respect to vibration applied between the first and second mounting members 12, 14.

When an internal fluid pressure change induced in the pressure receiving chamber 76 is transmitted to the equilibrium chamber 78 through the orifice passage 80, the diaphragm 30 undergoes distending/contracting deformation in association with change in an internal fluid pressure of the equilibrium chamber 78. While the diaphragm 30 is situated opposite to the bracket 74 at the intended abutment portion 67, the intended abutment portion 67 is restricted in an amount of outward distending deformation thereof. This arrangement makes it possible to prevent or moderate an interference or a contact between the diaphragm 30 and the bracket 74, when the diaphragm undergoes outward distending deformation in association with the fluid pressure increase in the equilibrium chamber 78.

Moreover, the intended abutment portion 67 has a specific structure in which an annular thick walled portion 69, the inner area 71 and the central thick-walled portion 73 are combined together as described above, providing durability of the intended abutment portion 67 considerably advantageously. Described in detail, the presence of the annular thick-walled portion 67 is substantially identical with a provision of an annular reinforcing member integrally formed on the intended abutment portion 67. During outward distending deformation of the diaphragm 30, every area of the diaphragm 30 is subjected to tensile force in all directions along a surface of the diaphragm 30. However, the area where the annular thick-walled portion 69 is formed, has a high spring stiffness in the circumferential direction, and accordingly is restricted in its elastic deformation. This arrangement makes it possible to disperse substantially evenly stress or deformation over the diaphragm 30 in the circumferential direction, while effectively limiting the amount of distending deformation of the intended abutment portion 67. Thus, the interference between the diaphragm 30 and the bracket 74 can be effectively prevented or minimized.

Since the inner area 71 situated inward of the annular thick-walled portion 69 has a thin wall thickness, a required amount of distending deformation of the diaphragm 30 can be allowed in this inner area 71, making it possible to eliminate a likelihood of a less amount of volumetric change of the equilibrium chamber 78 caused by an excess limitation of an amount of distending deformation of the intended abutment portion 67. Even if the intended abutment portion 67 undergoes excess distending deformation, and results in an interference or contact with the bracket 67, the central thick-walled portion 73 provided at the central portion of the inner area 71 where is expected the largest amount of outward distending deformation, may be brought into abutting contact with the bracket 74, thus providing durability of the abutment portion (central thick-walled portion 73) of the inner area 71 in an effective manner.

Namely, if the overall intended abutment portion 67 is formed with a large thickness, without providing the thin-walled inner area 71, the equilibrium chamber 78 may suffer from difficulty in permitting a required amount of volumetric change. It might be considerable that this problem may be solved by minimizing the size of the intended abutment portion 67, for example. However, the smaller the size of the intended abutment portion 67, the larger the stress concentration during its deformation, resulting in inevitable deterioration of the intended abutment portion 67. On the other hand, if the annular thick-walled portion 69 is employed together with the thin-walled inner area 71, according to the present embodiment, it becomes possible to obtain a sufficient amount of volumetric change of the equilibrium chamber 78, as well as to limit an amount of distending deformation of the intended abutment portion 67, while dispersing stress over a wide area of the intended abutment portion. Therefore, a sufficient amount of volumetric change of the equilibrium chamber 78 as well as a limitation of the distending displacement of the intended abutment portion 67 can be realized in a sophisticated and compassable manner.

While the presently preferred embodiment of this invention has been described in detail for the illustrative purpose only, it is to be understood that the present invention is not limited to the details of the illustrated embodiment. It is also to be understood that the present invention may be embodied with various changes, modifications and improvements which may occur to those skilled in the art, without departing from the spirit and scope of the invention, although detail description of these modifications is omitted.

In the illustrated embodiment, the one intended abutment portion 67 is formed at the one circumferential portion of the diaphragm 30. It may be possible to provide a plurality of intended abutment portions, each consisting of the thick-walled portion 69, the inner area 71 and/or the central thick-walled portion 73, at respective circumferential positions where the diaphragm 30 is opposite to other members such as a bracket, and is expected to come into contact or interference with these members.

While the diaphragm 30 is disposed about the elastic body 16 so as to surround the outside of the elastic body 16, the principle of the present invention includes a variety of disposing positions and mounting structures of a diaphragm, but not limited to the illustrated ones. For instance, the principle of the present invention may be applicable to a fluid filled elastic mount as disclosed in JP-2000-274480 wherein the second mounting member has a cylindrical configuration, and one open end of the second mounting member is fluid-tightly closed by the elastic body, and the other open end of the second mounting member is fluid-tightly closed by the flexible diaphragm, while a pacing between the elastic body and the diaphragm is divided by a partition member supported by the second mounting member into the pressure receiving chamber partially defined by the elastic body and the equilibrium chamber partially defined by the equilibrium chamber. In this mount, an intended abutment portion of illustrated specific structure may be formed on a central portion or other suitable portion on the diaphragm.

In the illustrated embodiment, the present invention is applied to a vibration damping device of passive type that exhibits damping effect with the help of pressure variation in a fluid sealed therein and flows of the fluid, which are passively caused due to input vibration, for the illustrative purpose only. It should be appreciated that the principle of the present invention may also be applicable to a vibration damping device of active type, as disclosed in the aforesaid citation 1, for example, in which an actuator is employed to actively control a fluid pressure variation of non-compressible fluid sealed therein in order to change damping characteristics of the device, or alternatively to compensate or minimize vibration.

Additionally, while the engine mount for automotive vehicles has been described as one preferred embodiment of the invention, the principle of the present invention may be equally applicable to a body mount, a member mount or other mounts for automotive vehicles, or a variety of vibration damping devices for other than automotive vehicles.

It is also to be understood that the present invention may be embodied with various other changes, modifications and improvements, which may occur to those skilled in the art, without departing from the spirit and scope of the invention defined in the following claims.

What is claimed is:

1. A fluid filled vibration damping device for connecting two members in a vibration damping fashion, comprising:
   a first mounting member fixable to one of the two members;
   a second mounting member fixable to an other of the two members;

an elastic body elastically connecting the first and second mounting members and partially defining a pressure receiving chamber filled with a non-compressible fluid and undergoing fluid pressure variation upon application of vibrational load between the first and second mounting members;

a flexible diaphragm partially defining an equilibrium chamber filled with the non-compressible fluid and whose volume is variable; and an orifice passage permitting a fluid communication between the pressure-receiving chamber and the equilibrium chamber, wherein the flexible diaphragm being constituted by a rubber elastic layer entirely and having an annular thick-walled portion and a central thick-walled portion situated at a substantially central portion of an inner area surrounded by the annular thick-walled portion, the inner area having a wall thickness smaller those of the annular thick-walled portion and the central thick-walled portion so that the inner area is easily deformable and the central thick-walled portion is spaced away from the annular thick-walled portion by the inner area;

wherein the elastic body has a large-diameter truncated conical shape overall, and the first mounting member is bonded to a small-diameter or central portion of the elastic body and the second mounting member is bonded to a large-diameter outer circumferential portion of the second mounting member so that the elastic body elastically connects the first and second mounting members, and the pressure receiving chamber is disposed on an inside of the elastic body, while the rubber elastic layer is disposed surrounding an outside surface of the elastic body such that a central portion thereof is bonded to the first mounting member and an outer peripheral portion thereof is bonded to the second mounting member, to dispose the equilibrium chamber on an outside of the elastic body surrounding the elastic body, wherein a mounting bracket for connecting the first mounting member to the one of the two members is disposed in a vicinity of the rubber elastic layer, and the rubber elastic layer has a curved slack portion and an intended abutment portion flatter than the curved slack portion and situated opposed to the mounting bracket, while the annular thick walled portion and the central thick walled portion are formed on the intended abutment portion of the rubber elastic layer, and wherein an opening of the orifice passage to the pressure receiving chamber is positioned circumferentially away from the intended abutment portion.

2. A fluid filled vibration-damping device according to claim 1, wherein the annular thick-walled portion has an inner and an outer circumferential edge of a smooth curvature configuration with no apparent corner on an entire circumference thereof.

3. A fluid filled vibration-damping device according to claim 1, wherein the annular thick-walled portion is partially bonded to the first or second mounting members.

4. A fluid filled vibration-damping device according to claim 1, wherein the rubber elastic layer measures a substantially same wall thickness dimension at an inside and an outside of the annular thick walled portion.

* * * * *